United States Patent [19]
Ichihashi

[11] Patent Number: 6,062,089
[45] Date of Patent: May 16, 2000

[54] SEMICONDUCTOR PRESSURE SENSOR HAVING A FLANGE SURFACE CONFIGURED TO FIT INTO A STEPPED HOLE OF A HOUSING BODY

[75] Inventor: Motomi Ichihashi, Tokyo, Japan

[73] Assignee: Mitsubishi Denki Kabushiki Kaisha, Tokyo, Japan

[21] Appl. No.: 09/092,057

[22] Filed: Jun. 5, 1998

[30] Foreign Application Priority Data

Jan. 28, 1998 [JP] Japan .................................. 10-015526

[51] Int. Cl.[7] ................................ G01L 9/00; G01L 9/16; G01L 7/00
[52] U.S. Cl. ................................................. 73/754; 73/706
[58] Field of Search .............................. 73/716, 717, 720, 73/721, 723, 726, 727, 719, 725, 754, 756, 706; 361/283.4

[56] References Cited

U.S. PATENT DOCUMENTS

| | | | |
|---|---|---|---|
| 4,563,697 | 1/1986 | Miura .......................................... 357/26 |
| 4,771,639 | 9/1988 | Saigusa et al. ............................. 73/727 |
| 5,207,102 | 5/1993 | Takahashi et al. ......................... 73/706 |
| 5,625,151 | 4/1997 | Yamaguchi ................................. 73/716 |
| 5,783,750 | 7/1998 | Otani ........................................... 73/721 |
| 5,859,759 | 1/1999 | Moriyama et al. ..................... 361/283.4 |

FOREIGN PATENT DOCUMENTS

| | | |
|---|---|---|
| 1-061631 | 3/1989 | Japan . |
| 1-98936 | 4/1989 | Japan . |
| 1-150832 | 6/1989 | Japan . |
| 1-169333 | 7/1989 | Japan . |

*Primary Examiner*—William Oen
*Attorney, Agent, or Firm*—Oblon, Spivak, McClelland, Maier & Neustadt, P.C.

[57] ABSTRACT

The pressure sensor is simplified in structure and its assembled state to the housing body is made more compact. In the semiconductor pressure sensor for detecting pressure of a pressure medium, the semiconductor pressure sensor has a semiconductor sensor element for pressure detection supported by a sensor body via a pedestal seat and is assembled to a housing body that partitions the pressure medium and outside from each other. The sensor body is formed into a plate shape of a specified thickness having a flange portion, where the pedestal seat for joining and supporting the semiconductor sensor element and an adjustment circuit board for the semiconductor sensor element are joined on one surface side of the sensor body. The sensor body is fixed by being inserted into a stepped through hole provided in the housing body.

16 Claims, 7 Drawing Sheets

SEMICONDUCTOR PRESSURE SENSOR HAVING A FLANGE SURFACE CONFIGURED TO FIT INTO A STEPPED HOLE OF A HOUSING BODY

BACKGROUND OF THE INVENTION

The present invention relates to semiconductor pressure sensors and, more particularly, to a semiconductor pressure sensor which uses, as its detector element, a semiconductor sensor element capable of detecting any strain and/or stress that occurs to a thin-walled pressure receiving portion, and besides which is used as it is assembled to a housing body that partitions a pressure medium from outside.

Conventionally, as one type of pressure sensor, there has been known one which uses, as its pressure detecting element, a semiconductor sensor element (hereinafter, abbreviated simply as sensor element when appropriate) capable of detecting a strain and/or stress that occurs to a thin-walled pressure receiving portion by making use of the semiconductors' piezoresistance effect. Using this type of pressure detecting element makes it possible to detect with high accuracy the magnitude and/or change of a pressure that acts on the pressure receiving portion as a magnitude and/or change of a strain and/or stress and then to convert the detection result into an electric signal as an output.

Also, in such a semiconductor pressure sensor, there has been known one which is put into use in a state that the pressure sensor is assembled to a housing body serving as a pressure partition wall that partitions a pressure medium the pressure of which is to be detected and outside (i.e., one side on which the pressure medium is present and the other side on which the pressure medium is not present) from each other (see, for example, Japanese Patent Laid-Open Publication HEI 1-98936, SHO 64-61631 or HEI 1-169333).

FIG. 17 is a partial cross-sectional explanatory view showing the structure and the housing-body assembled state in an example of a prior art semiconductor pressure sensor (hereinafter, abbreviated simply as pressure sensor or sensor when appropriate).

This pressure sensor 201 according to the prior art example is of the so-called can-package (can sealing) type. The pressure sensor comprises an sensor assembly 205 which contains a unit body, although not shown in detail, comprising a semiconductor sensor element made of, for example, silicon, a pedestal seat made of silicon for joining and supporting the sensor element, a base member for joining and supporting the pedestal seat, and the like, and which is formed up by covering this integrally joined unit body with a cap, where a pressure introducing pipe 209 is integrally fixed to the sensor assembly 205.

By this pressure introducing pipe 209, a pressure medium in an interior Si of a housing body 210 is introduced into the sensor assembly 205. Also, via this pressure introducing pipe 209, the sensor assembly 205 is fixed to an adjustment circuit board 206. This adjustment circuit board 206 comprises a resistor circuit for adjusting electrical characteristics of the sensor element, a signal amplifying circuit and the like.

In addition, as to the arrangement of such an adjustment circuit board, there has been disclosed in, for example, Japanese Patent Laid-Open Publication HEI 1-150832, a can-package type semiconductor pressure sensor in which the adjustment circuit board is placed in proximity to the sensor chip so that the sensor can be downsized.

For the assembly of the pressure sensor 201 to the housing body 210, a straight through hole 210H is previously provided in the housing body 210 and a pressure introducing pipe 209 of the pressure sensor 201 is inserted into the through hole 210H, in which state the adjustment circuit board 206 is held to a holder 213 provided in the housing body 210. By this arrangement, the pressure sensor 201 is fixed to the housing body 210 via the adjustment circuit board 206. A seal member 219 (O-ring) is fitted on the periphery of the through hole 210H of the housing body 210, by which leakage of the pressure medium to outside So of the housing body 210 is prevented.

The housing body 210 is equipped with a system circuit board 211 on which electric circuits or the like for a system controlled by using a pressure detection result (more specifically, machines, appliances, devices or equipment or equipment systems using these) are mounted. This system circuit board 211 and the adjustment circuit board 206 of the pressure sensor 201 are electrically connected to each other by a lead wire 212. This lead wire 212 enables the feeding of power to the pressure sensor 201, the extraction of a detection signal from the pressure sensor 201, and the like.

In recent years, for pressure sensors themselves including an adjustment circuit board as described above as well as even the systems in which pressure detection is to be done, there has been a demand for even more compactness and lower costs further than before.

However, the conventional pressure sensor 201 as described above has a disadvantage in reducing the cost because it involves large number of parts and its construction is rather complicated.

Also, with regard to the assembly state to the housing body 210 on the system side, since the assembly is done with the adjustment circuit board 206 held to the holder 213 on the exterior side of the housing body 210, the system is protruded to a considerable extent to the outside So of the housing body 210. Thus, it is difficult to attain a compact assembled state.

In addition, particularly recently, there is a tendency to design higher integrations by incorporating into the sensor element itself an output adjusting circuit having resistor circuits or signal amplification circuits or the like for adjusting the electrical characteristics of the sensor element, instead of providing the adjustment circuit board separately from the sensor element. However, even with the use of such sensor element, the pressure sensor itself and systems in which pressure detection is to be done have been under a desire for even more compactness and lower costs.

The present invention having been accomplished in view of the above technical problems, an object of the invention is to provide a semiconductor pressure sensor which can be simplified in its own construction, and which can be assembled to the housing body in a more compact state.

For this object, according to a first aspect of the present invention, there is provided a semiconductor pressure sensor for detecting pressure of a pressure medium, the semiconductor pressure sensor having a semiconductor sensor element for pressure detection supported by a sensor body via a pedestal seat and being assembled to a housing body that partitions the pressure medium and outside from each other, wherein the sensor body is formed into a plate shape of a specified thickness having a flange portion, where the pedestal seat for joining and supporting the semiconductor sensor element and an adjustment circuit board for the semiconductor sensor element are joined on one surface side of the sensor body, and wherein the sensor body is fixed by being inserted into a stepped through hole provided in the housing body.

According to the first aspect of the present invention, in a semiconductor pressure sensor of the type that the adjustment circuit board for the semiconductor sensor element is provided separately from the sensor element, the sensor body is plate shaped and the adjustment circuit board is joined to this sensor body. Therefore, as compared with the conventional case in which this adjustment circuit board would be provided separately from the sensor body, the pressure sensor can be simplified in construction and reduced in parts number, which can contribute to a reduction in the manufacturing cost of the pressure sensor.

Also, since the sensor body is formed into a plate shape of a specified thickness having a flange portion and fixed by being inserted into the stepped through hole provided in the housing body, the sensor body can be fixed directly to the housing body in assembling the pressure sensor to the housing body, so that the assembling structure of the pressure sensor to the housing body can be simplified to a large extent, as compared with the conventional case in which the adjustment circuit board provided separately from the sensor body would be held by a holder provided in the housing body. In this case, the sealability between inside and outside of the housing body is ensured at the abutting surface between the flange portion of the sensor body and the stepped portion of the through hole of the housing body. Further, by appropriately setting the thickness of the sensor body in view of the thickness of the housing body, the extent to which the pressure sensor is protruded from the housing body surface can be made far smaller than the conventional counterpart. As a result of this, the assembled state of the pressure sensor to the housing body can be made very compact.

In a second aspect of the present invention, there is provided a semiconductor pressure sensor for detecting pressure of a pressure medium, the semiconductor pressure sensor having a semiconductor sensor element for pressure detection supported by a sensor body via a pedestal seat and being assembled to a housing body that partitions the pressure medium and outside from each other, wherein the sensor body is formed into a plate shape of a specified thickness having a flange portion, where the pedestal seat for joining and supporting the semiconductor sensor element having an output adjustment circuit is joined on one surface side of the sensor body, and wherein the sensor body is fixed by being inserted into a stepped through hole provided in the housing body.

According to the second aspect of the present invention, the sensor body is plate shaped and one type of semiconductor sensor element having an output adjustment circuit is used. As a result, the pressure sensor can be reduced in planar size and besides simplified in structure, while the parts number involved can be further reduced.

Furthermore, since the sensor body is formed into a plate shape of a specified thickness having a flange portion and fixed by being inserted into a stepped through hole provided in the housing body, the sensor body can be fixed directly to the housing body in assembling the pressure sensor to the housing body, so that the assembling structure of the pressure sensor to the housing body can be simplified to a large extent, as compared with the conventional case in which the adjustment circuit board provided separately from the sensor body would be held by a holder provided in the housing body. In this case, the sealability between inside and outside of the housing body is ensured at the abutting surface between the flange portion of the sensor body and the stepped portion of the through hole of the housing body. Further, by appropriately setting the thickness of the sensor body in view of the thickness of the housing body, the extent to which the pressure sensor is protruded from the housing body surface can be made far smaller than the conventional counterpart. As a result of this, the assembled state of the pressure sensor to the housing body can be made very compact.

In a third aspect of the present invention, there is provided a semiconductor pressure sensor according to the first or second aspect, wherein the sensor body is fixed by being caulked to the housing body.

According to the third aspect of the present invention, basically, the same effects as in the first or second aspect can be produced. In particular, since the sensor body is caulked and fixed to the housing body, the plate-shaped sensor body can be fixed to the through hole of the housing body easily and reliably, while enough fixing force to ensure the sealability between inside and outside of the housing body can be obtained.

In a fourth aspect of the present invention, there is provided a semiconductor pressure sensor according to the first or second aspect, wherein the sensor body is fixed by being tightened to the housing body with a screw.

According to the fourth aspect of the present invention, basically, the same effects as in the first or second aspect can be produced. In particular, since the sensor body is fixed to the housing body by being tightened with a screw, the plate-shaped sensor body can be fixed to the through hole of the housing body easily and reliably, while enough fixing force to ensure the sealability between inside and outside of the housing body can be obtained.

In a fifth aspect of the present invention, there is provided a semiconductor pressure sensor according to any one of the first to fourth aspects, wherein a seal member is provided between a stepped portion of the through hole of the housing body and the flange portion of the sensor body.

According to the fifth aspect of the present invention, basically, the same effects as in any one of the first to fourth aspects can be produced. Besides, since the seal member is provided between the stepped portion of the through hole of the housing body and the flange portion of the sensor body, the sealability between inside and outside of the housing body can be enhanced to a large extent. In other words, because enough sealability can be ensured by less fixing force, such problems as occurrence of strain in the sensor body due to the effect of the fixing force can be avoided more reliably.

Further, when there is a difference in thermal expansion coefficient between the housing body and the sensor body, it could occur that the sensor body is stressed by the housing body based on this difference. In such a case, however, the strain that could occur to the sensor body can be suppressed to a minimum by buffering the stress derived from the housing body. Moreover, occurrence of such problems as adverse effects on the output characteristics of the semiconductor sensor element can be effectively prevented.

In a sixth aspect of the present invention, there is provided a semiconductor pressure sensor according to the fifth aspect, wherein a protective mechanism for the seal member to protect the seal member from being excessively deformed is provided at either one of the stepped portion of the through hole of the housing body or the flange portion of the sensor body.

According to the sixth aspect of the present invention, basically, the same effects as in the fifth aspect can be produced. In particular, a protective mechanism for the seal member to protect the seal member from being excessively deformed is provided at either one of the stepped portion of the through hole of the housing body or at the flange portion of the sensor body. Therefore, upon the action of a fixing force with which the sensor body is fixed to the housing body, the occurrence of impairment of the sealability and the buffering performance due to excessive deformation of the seal member can be reliably prevented.

In a seventh aspect of the present invention, there is provided a semiconductor pressure sensor according to any one of the first to sixth aspects, wherein a reinforcing portion is formed on the other surface side of the sensor body.

According to the seventh aspect of the present invention, basically, the same effects as in any one of the first to sixth aspects can be produced. Besides, since the reinforcing portion is formed on the other surface side of the sensor body, the rigidity of the sensor body is enhanced. Therefore, upon the action of a fixing force with which the sensor body is fixed to the housing body or the action of pressure of the pressure medium, deformation of the sensor body and the resultant effect of stress on the semiconductor sensor element can be suppressed.

In an eighth aspect of the present invention, there is provided a semiconductor pressure sensor according to the seventh aspect, wherein the reinforcing portion is formed into a beam shape.

According to the eighth aspect of the present invention, basically, the same effects as in the seventh aspect can be produced. In particular, since the reinforcing portion is formed into a beam shape concretely, the sensor body is reinforced along this beam, thus being enhanced in its rigidity.

In a ninth aspect of the present invention, there is provided a semiconductor pressure sensor according to the seventh aspect, wherein the reinforcing portion is formed concentric with a pressure introducing hole to the semiconductor sensor element.

According to the ninth aspect of the present invention, basically, the same effects as in the seventh aspect can be produced. In particular, the reinforcing portion is formed concentric with a pressure introducing hole to the semiconductor sensor element concretely, the sensor body is reinforced concentrically with the pressure introducing hole, thus being enhanced in rigidity.

DETAILED DESCRIPTION OF THE PREFERRED EMBODIMENTS

Figure 1:
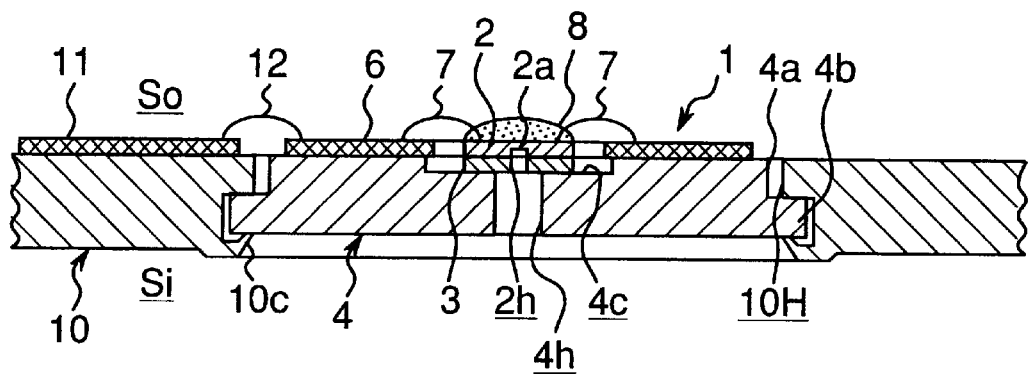
FIG. 1 is a longitudinal cross-sectional explanatory view showing the construction of a semiconductor pressure sensor according to a first embodiment of the invention as well as an assembled state of the semiconductor pressure sensor to the housing body.

Hereinbelow, embodiments of the present invention are described in detail based on the accompanying drawings.
Embodiment 1:

First, a semiconductor pressure sensor 1 (hereinafter, abbreviated simply as pressure sensor or sensor when appropriate) according to a first embodiment of the present invention as shown in FIG. 1 is described.

Figure 2:
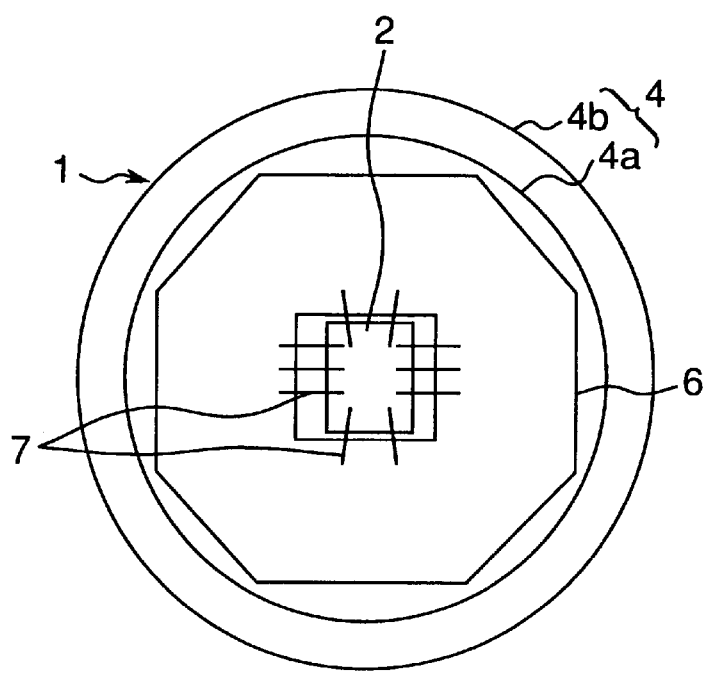
FIG. 2 is a plan explanatory view of the semiconductor pressure sensor according to the first embodiment.

FIG. 1 is a longitudinal cross-sectional explanatory view showing the construction of the pressure sensor 1 according to the first embodiment of the invention as well as an assembled state of the semiconductor pressure sensor to a housing body 10. Also, FIG. 2 is a plan explanatory view of the pressure sensor.

As shown in these figures, the pressure sensor 1 comprises a semiconductor sensor element 2 (hereinafter, abbreviated simply as sensor element when appropriate) having at a central portion a thin-walled pressure receiving portion 2a, a pedestal seat 3 made of, for example, silicon for joining and supporting the sensor element 2, and a sensor body 4 for supporting the semiconductor sensor element 2 for use of pressure detection via the pedestal seat 3 by joining and supporting the pedestal seat 3.

The sensor body 4, which is formed into a circular disc shape of a specified thickness as a whole, has a base portion 4a for joining and supporting the pedestal seat 3 on one surface side and a flange portion 4b provided on the periphery side. This flange portion 4b is formed integrally with the base portion 4a by, for example, press molding the peripheral portion of the base portion 4a, where a flat flange surface 4f is formed between the base portion 4a and the flange portion 4b.

More preferably, a recessed portion 4c of a specified depth is provided in a central portion of the base portion 4a on the one surface side, where the pedestal seat 3 is joined onto the recessed portion 4c.

On the base portion 4a in the vicinity of the recessed portion 4c, is fixed an adjustment circuit board 6 equipped with a resistor circuit for adjusting the electrical characteristics of the sensor element 2, a signal amplifying circuit or the like. This adjustment circuit board 6 and the sensor element 2 are electrically connected to each other via a plurality of wires 7. In this way, the adjustment circuit board 6 for the sensor element 2 is fixed directly onto the sensor body 4.

As shown above, the pedestal seat 3, the sensor element 2 and the adjustment circuit board 6 are stacked and joined one by one on the base of the sensor body 4, by which one unit body is constituted.

In addition, pressure introducing holes 4h and 3h are provided in central portions of the base portion 4a of the sensor body 4 and the pedestal seat 3 so as to be drilled through thicknesswise.

The semiconductor sensor element 2, as is well known conventionally, detects the magnitude and/or change of a pressure by detecting strain and/or stress by making use of the semiconductors' piezoresistance effect. In this embodiment, the sensor element 2 is one made of silicon (Si) single crystal as an example.

As can be well understood from FIG. 2, the sensor element 2 is formed, for example, into a rectangular plate member as viewed in plan view and the thin-walled pressure receiving portion 2a is formed at a central portion of the sensor element 2 as described above. A lower end face around the pressure receiving portion 2a is joined to the upper surface of the pedestal seat 3.

The lower surface side of the sensor element 2 and the upper surface of the pedestal seat 3, as well as the lower surface of the pedestal seat 3 and the upper surface of the base portion 4a of the sensor body 4 are firmly joined to each other, respectively, by the so-called die bonding process so as to be sealed airtight and fluid-tight.

Besides, by joining the three members 2, 3 and 4 together in this way, the pressure introducing hole 4h of the sensor body 4 and the pressure introducing hole 3h of the pedestal seat 3 are communicated with each other, thus forming a passage for introducing to the pressure receiving portion 2a of the sensor element 2 a pressure medium to detect its pressure.

In addition, the sensor element 2 is covered on its counter-pedestal seat side with a gel layer 8 for use of surface protection after the sensor element 2 and the adjustment circuit board 6 are connected to each other via the wires 7.

The pressure sensor 1 constructed as described above, when applied to a system controlled by using pressure detection results (more specifically, machines, appliances, devices or equipment or equipment systems using these), is used in the state that it is assembled to the housing body 10 serving as a partition wall that partitions between the pressure medium to detect the pressure and the outside (i.e., between one side on which the pressure medium is present and the other side on which the pressure medium is not present).

The housing body 10 has a stepped through hole 10H provided therein, so that the sensor body 4 is fixed by being inserted into this through hole 10H.

Figure 3:
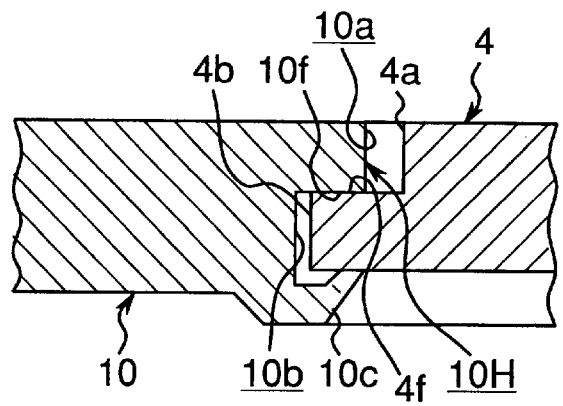
FIG. 3 is a longitudinal cross-sectional explanatory view showing in enlargement the state in which the semiconductor pressure sensor according to the first embodiment is assembled to the housing body.

More specifically, the through hole 10H, as detailed in FIG. 3, has a step gap formed by a small-diameter portion 10a having an inner diameter set larger than outer diameter of the base portion 4a of the sensor body 4 by a specified amount, and a large-diameter portion 10b having an inner diameter set larger than the outer diameter of the flange portion 4b of the sensor body 4 by a specified amount, and moreover a flat receiving surface 10f is formed between the small-diameter portion 10a and the large-diameter portion 10b (i.e., on the rear surface side of the small-diameter portion 10a).

Besides, on the peripheral edge portion of the large-diameter portion 10b, is provided a caulking portion 10c for fixing the inserted sensor body 4 into the through hole 10H, as will be described later. The caulking portion 10c will keep opened along the peripheral edge portion of the large-diameter portion 10b until the caulking work is done after the insertion of the sensor body 4 into the through hole 10H.

With this constitution, in the process of assembling the pressure sensor 1 to the housing body 10, a unit body is preliminarily made up from the sensor body 4, the pedestal seat 3, the sensor element 2 and the adjustment circuit board 6, and then the resulting unit body is inserted into the through hole 10H from inside of the housing body 10.

Besides, after the flange surface 4f of the sensor body 4 is stopped in contact with the receiving surface 10f of the housing body 10, the caulking portion 10c of the housing body 10 is bent inward by using a press so that the sensor body 4 is fixed into the through hole 10H.

In this process, by the flange surface 4f of the sensor body 4 making contact with the receiving surface 10f of the housing body 10, inside Si and outside So of the housing body 10 are sealed from each other airtight and/or fluid-tight, while the pressing pressure in the caulking work is set to an appropriate one so as not to cause any excessive strain to the sensor element 2. In this way, the sensor body 4 is fixed directly to the housing body 10.

The caulking portion 10c is, preferably, provided continuously along the peripheral edge portion of the through hole 10H with views to successfully ensuring the sealability between the flange surface 4f of the sensor body 4 and the receiving surface 10f of the housing body 10 and successfully maintaining the balance of stresses that occur to the sensor body 4 due to the caulking work. Otherwise, however, a plurality of caulking portions may be provided at regular intervals along the peripheral edge portion of the through hole 10H.

The thickness of the sensor body 4 is preferably set thinner than the thickness of the housing body 10 so that their surfaces are generally flush with each other in the assembled state. Accordingly, the extent to which the pressure sensor 1 is protruded from the surface of the housing body 10 is far smaller than in the conventional case (see FIG. 16).

Besides, it is also possible to further lessen this extent of protrusion by setting the thickness of the base portion 4a of the sensor body 4 to a thinner one or by setting the depth of the recessed portion 4c to a deeper one.

On the housing body 10 is installed a system circuit board 11 on which electric circuits or the like of a system controlled by using pressure detection results are mounted. After the pressure sensor 1 is assembled to the housing body 10, the system circuit board 11 and the adjustment circuit board 6 of the pressure sensor 1 are electrically connected to each other by a lead wire 12. This lead wire 12 allows the feeding of power to the pressure sensor 1 and the extraction of a detection signal from the sensor 1 and the like to be done.

In addition, the pressure detection of the pressure medium (inside Si of the housing body 10) by the pressure sensor 1 is performed by taking the pressure of the outside So of the housing body 10 (normally, atmospheric pressure) as a reference pressure. Also, the semiconductor sensor element 2 is similar to those conventionally known and therefore detailed description and illustration of its construction and operation and the like are omitted.

As described above, according to this embodiment, the sensor body 4 is formed into a plate shape and the adjustment circuit board 6 for the sensor element 2 is joined to the sensor body 4. Therefore, as compared with the conventional case in which this adjustment circuit board would be provided separately from the sensor body, the pressure sensor 1 can be simplified in construction and reduced in parts number, which can contribute to a reduction in the manufacturing cost of the pressure sensor 1.

Further, the sensor body 4 is formed into a plate shape of a specified thickness having the flange portion 4b, and fixed by being inserted into the stepped through hole 10H provided in the housing body 10. Therefore, the sensor body 4 can be fixed directly to the housing body 10 so that the assembling structure of the pressure sensor 1 to the housing body 10 can be simplified to a large extent, as compared with the conventional case in which the adjustment circuit board provided separately from the sensor body would be held by a holder provided in the housing body. In this case, the sealability between inside Si and outside So of the housing body 10 is ensured at the abutting surface between the flange portion 4b of the sensor body 4 and the stepped portion of the through hole 10H of the housing body 10. Further, by appropriately setting the thickness of the sensor body 4 in view of the thickness of the housing body 10, the extent to which the pressure sensor is protruded from the housing body surface can be made far smaller than the conventional counterpart. As a result of this, the assembled state of the pressure sensor 1 to the housing body 10 can be made very compact.

Furthermore, in this embodiment, the sensor body 4 is caulked and fixed to the housing body 10. Therefore, the plate-shaped sensor body 4 can be fixed to the through hole 10H of the housing body 10 easily and reliably, while enough fixing force to ensure the sealability between inside Si and outside So of the housing body 10 can be obtained.

Embodiment 2:

Next, a semiconductor pressure sensor according to a second embodiment of the invention is described. In the following description, component parts similar to those of the first embodiment are designated by same reference numerals and their further description is omitted.

Figure 4:
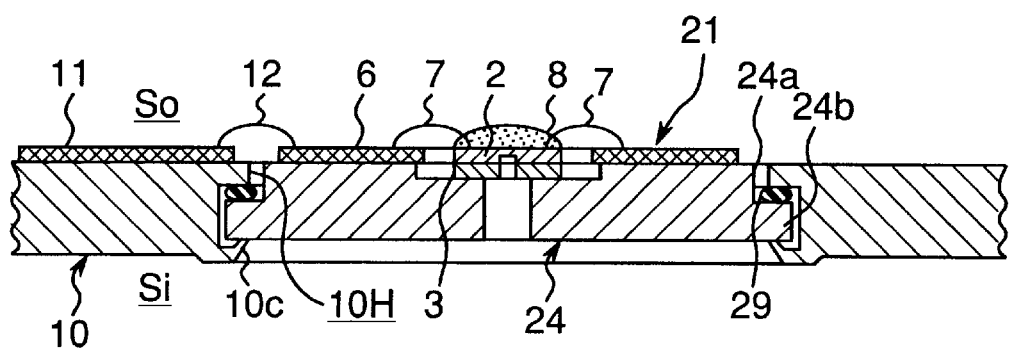
FIG. 4 is a longitudinal cross-sectional explanatory view showing the construction of a semiconductor pressure sensor according to a second embodiment of the invention as well as an assembled state of the semiconductor pressure sensor to the housing body.
Figure 5:
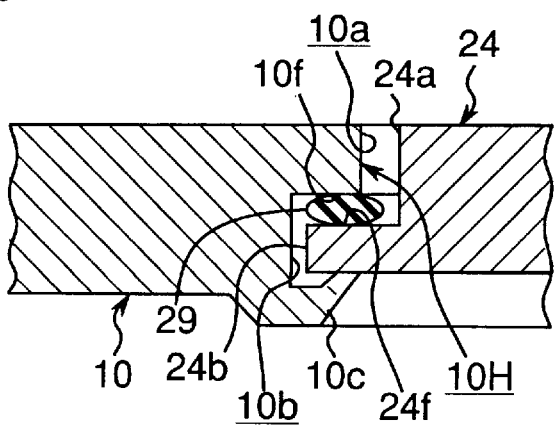
FIG. 5 is a longitudinal cross-sectional explanatory view showing in enlargement the state in which the semiconductor pressure sensor according to the second embodiment is assembled to the housing body.

As shown in FIGS. 4 and 5, in the semiconductor pressure sensor 21 according to this second embodiment, a seal member 29 (e.g., a so-called O-ring) is provided between a flange surface 24f of a sensor body 24 and the receiving surface 10f of the housing body 10.

The sensor body 24, as in the first embodiment, comprises a base portion 24a and a flange portion 24b. The flange portion 24b is set to a thickness thinner than the sensor body 4 of the first embodiment by an amount equivalent to the thickness of the seal member 29 after its compression, with a view to ensuring an interposition space for the seal member 29 against the receiving surface 10f of the housing body 10. Instead of this, it is also possible to set the thickness of the small-diameter portion 10a of the through hole 10H of the housing body 10 to a thinner one.

As shown above, in this embodiment, because the seal member 29 is provided between the stepped portion of the through hole 10H of the housing body 10 and the flange portion 24b of the sensor body 24, the sealability between inside Si and outside So of the housing body 10 can be enhanced to a large extent. In other words, because enough sealability can be ensured by less fixing force, such problems as occurrence of strain in the sensor body 24 due to the effect of the fixing force can be avoided more reliably.

Also, when there is a difference in thermal expansion coefficient between the housing body 10 and the sensor body 24, it could occur that the sensor body 24 is stressed by the housing body 10 based on this difference. In such a case, however, the strain that could occur to the sensor body 24 can be suppressed to a minimum by buffering the stress derived from the housing body 10. Moreover, such problems as adverse effects on the output characteristics of the semiconductor sensor element 2 can be effectively prevented.

Embodiment 3:

Next, a semiconductor pressure sensor according to a third embodiment of the invention is described.

Figure 6:
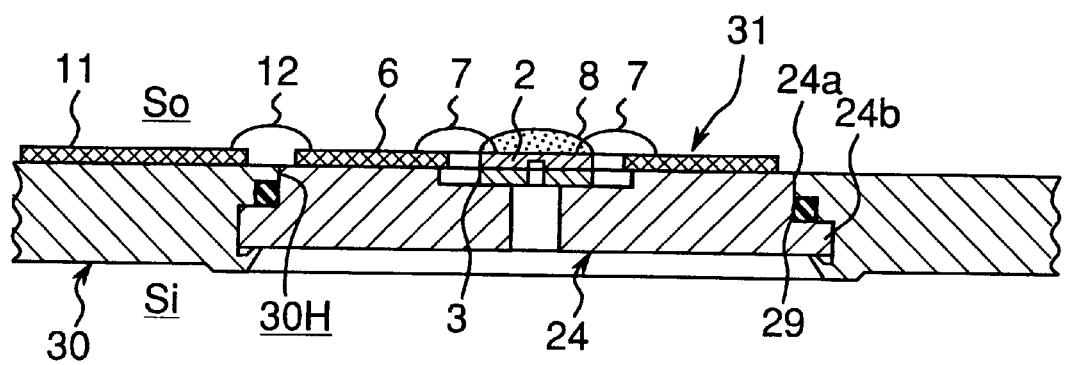
FIG. 6 is a longitudinal cross-sectional explanatory view showing the construction of a semiconductor pressure sensor according to a third embodiment of the invention as well as an assembled state of the semiconductor pressure sensor to the housing body.
Figure 7:
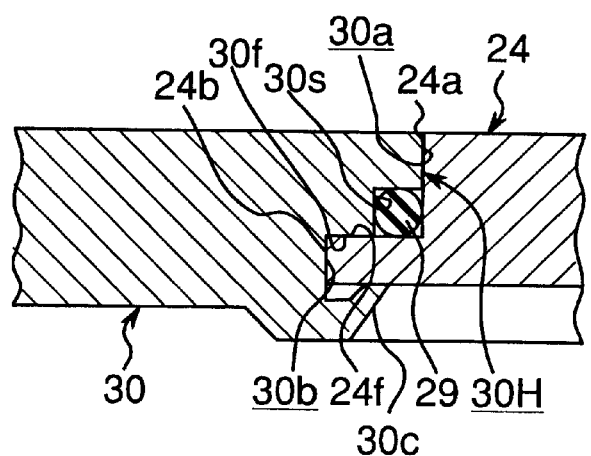
FIG. 7 is a longitudinal cross-sectional explanatory view showing in enlargement the state in which the semiconductor pressure sensor according to the third embodiment is assembled to the housing body.

As shown in FIGS. 6 and 7, in the semiconductor pressure sensor 31 according to this third embodiment, a seal member 29 (e.g., a so-called O-ring) is provided between the flange surface 24f of the sensor body 24 and a receiving surface 30f of the housing body 30 as in the second embodiment.

Besides, in this embodiment, a ring-shaped protective stepped portion 30s is provided, as a protective mechanism for the seal member 29 to protect the seal member 29 from being excessively deformed, at the stepped portion of a through hole 30H of the housing body 30, i.e., at the receiving surface 30f formed between a small-diameter portion 30a and a large-diameter portion 30b. Depth and width of this stepped portion 30s are so set that the amount of compression of the seal member 29 will be maintained appropriately, not excessively large, when the flange surface 24f of the sensor body 24 is stopped in contact with the receiving surface 30f of the housing body 30.

In addition, in this case, preferably, the gap between the small-diameter portion 30a of the through hole 30H and base portion 24a of the sensor body 24 is set as small as possible within a necessary range in order that the seal member 29 is prevented from being projected out.

As shown above, the protective stepped portion 30s for the seal member 29 is provided as a protective mechanism to protect the seal member 29 from being excessively deformed, at either one of the stepped portion of the through hole 30H of the housing body 30 or at the flange portion 24b of the sensor body 24 (in this embodiment, on the through hole 30H side). Therefore, upon the action of a fixing force with which the sensor body 24 is fixed to the housing body 30, the occurrence of impairment of the sealability and the aforementioned buffering performance due to excessive deformation of the seal member can be reliably prevented.

Embodiment 4:

Next, a fourth embodiment of the invention is described. This fourth embodiment is a modification of the foregoing third embodiment, in which a protective mechanism for the seal member 29 is provided on the sensor body side.

Figure 8:
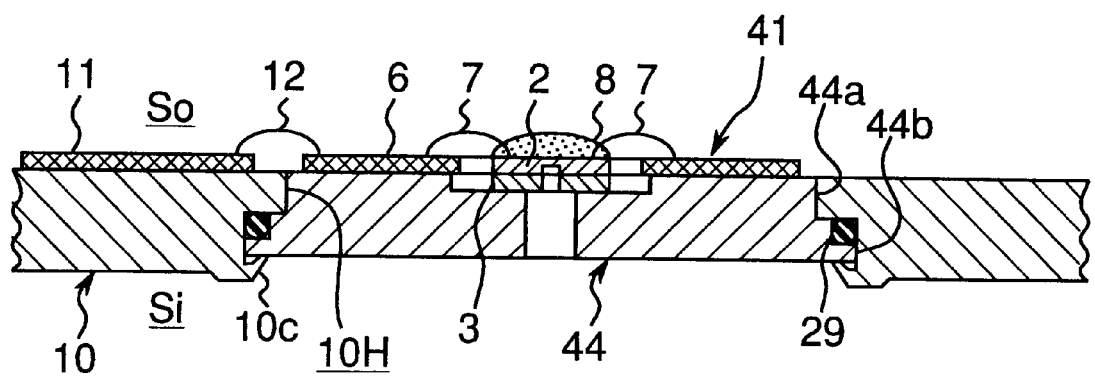
FIG. 8 is a longitudinal cross-sectional explanatory view showing the construction of a semiconductor pressure sensor according to a fourth embodiment of the invention as well as an assembled state of the semiconductor pressure sensor to the housing body.
Figure 9:
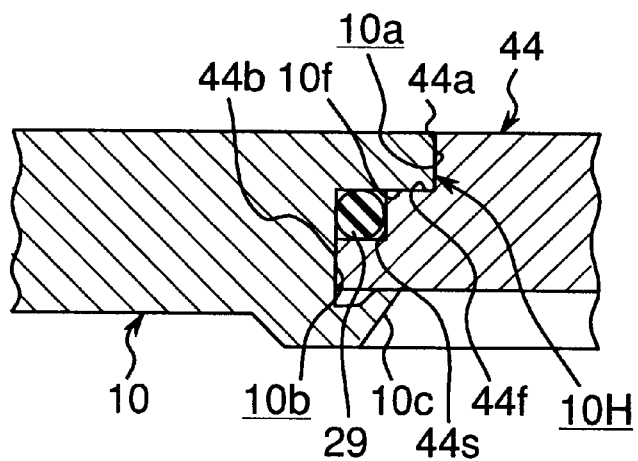
FIG. 9 is a longitudinal cross-sectional explanatory view showing in enlargement the state in which the semiconductor pressure sensor according to the fourth embodiment is assembled to the housing body.

As shown in FIGS. 8 and 9, in the semiconductor pressure sensor 41 according to this fourth embodiment, a ring-shaped protective stepped portion 44s is provided, as a protective mechanism for the seal member 29, in a flange surface 44f formed between base portion 44a and flange portion 44b of a sensor body 44. The setting of depth and width of this stepped portion 44s is basically similar to the setting of depth and width of the protective stepped portion 30s in the third embodiment.

Embodiment 5:

Next, a fifth embodiment of the invention is described. This fifth embodiment is a modification of the third or fourth embodiment, in which the protective mechanism for the seal member 29 is formed into a recessed groove.

Figure 10:
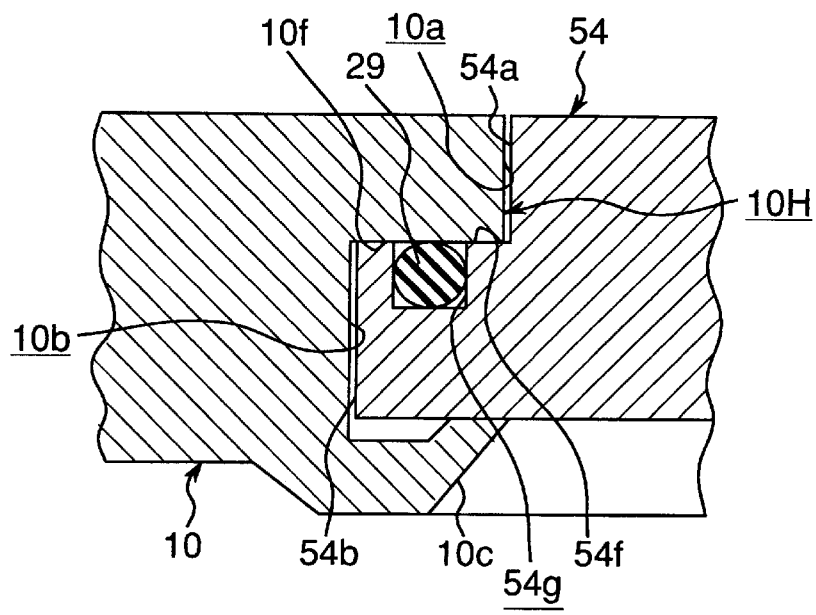
FIG. 10 is a longitudinal cross-sectional explanatory view showing in enlargement the state in which a semiconductor pressure sensor according to a fifth embodiment of the invention is assembled to the housing body.
Figure 11:
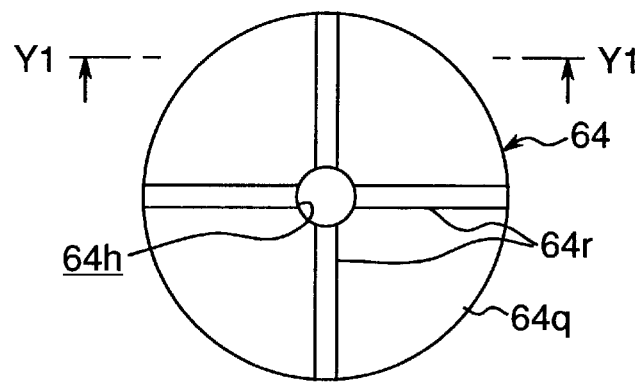
FIG. 11 is a bottom explanatory view of a sensor body in a semiconductor pressure sensor according to a sixth embodiment of the invention.
Figure 12:
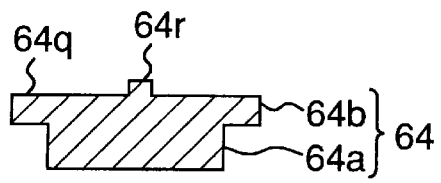
FIG. 12 is a longitudinal cross-sectional explanatory view taken along the line Y1—Y1 of FIG. 11.

As shown in FIG. 10, in this embodiment, a ring-shaped protective groove portion 54g is provided, as a protective mechanism for the seal member 29, in a flange surface 54f formed between base portion 54a and flange portion 54b of a sensor body 54. The setting of depth and width of this groove portion 54g is basically similar to the setting of depth and width of the protective stepped portion 30s and 44s as described above.

In addition, such a protective groove portion may be provided on the receiving surface 10f side of the housing body 10.

Embodiment 6:

Next, a sixth embodiment of the invention is described. A sensor body 64 according to this embodiment comprises a base portion 64a and a flange portion 64b and has a whole configuration similar to that of the foregoing embodiments, whereas a reinforcing portion 64r is provided on a rear surface 64q side (i.e., counter-pedestal seat side) of the sensor body 64.

Concretely, this reinforcing portion 64r is formed into a beam shape having specified width and height and provided in a plural number (four in this embodiment) radially from the center of the rear surface 64q of the sensor body 64 except the portion of a pressure introducing hole 64h.

As shown above, in this embodiment, since the reinforcing portion 64r is formed on the rear surface 64q side of the sensor body 64, the rigidity of the sensor body 64 is enhanced. Therefore, upon the action of a fixing force with which the sensor body 64 is fixed to the housing body or the action of pressure of the pressure medium, deformation of the sensor body 64 and the resultant effect of stress on the semiconductor sensor element 2 can be suppressed.

In particular, since the reinforcing portion 64r is formed into a beam shape concretely, the sensor body 64 is reinforced along this reinforcing portion 64r, thus being enhanced in its rigidity.

Embodiment 7:

Next, a seventh embodiment of the invention is described. This seventh embodiment is a modification of the foregoing sixth embodiment.

Figure 13:
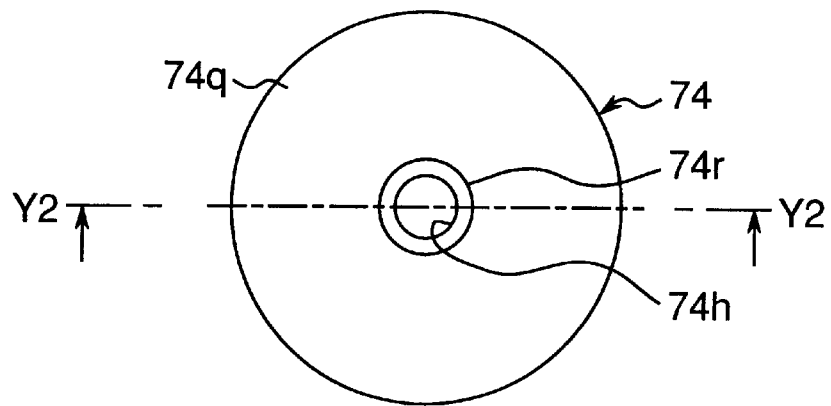
FIG. 13 is a bottom explanatory view of a sensor body in a semiconductor pressure sensor according to a seventh embodiment of the invention.
Figure 14:
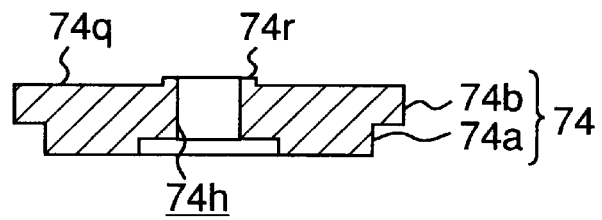
FIG. 14 is a longitudinal cross-sectional explanatory view taken along the line Y2—Y2 of FIG. 13.

As shown in FIGS. 13 and 14, a sensor body 74 according to this embodiment comprises a base portion 74a and a flange portion 74b and has a whole configuration similar to that of the foregoing embodiments.

In this embodiment, on a rear surface 74q side of the sensor body 74 is provided a reinforcing portion 74r which is formed concentric with a pressure introducing hole 74h and which has specified width and height. By this reinforcing portion 74r, the sensor body 74 is reinforced concentrically with the pressure introducing hole 74h, thus being enhanced in rigidity. Otherwise, such a reinforcing portion 74r may be provided in some plural number with specified intervals.

Embodiment 8:

Next, an eighth embodiment of the invention is described. This eighth embodiment employs a screw for the process of fixing the sensor body of the pressure sensor to the through hole of the housing body.

Figure 15:
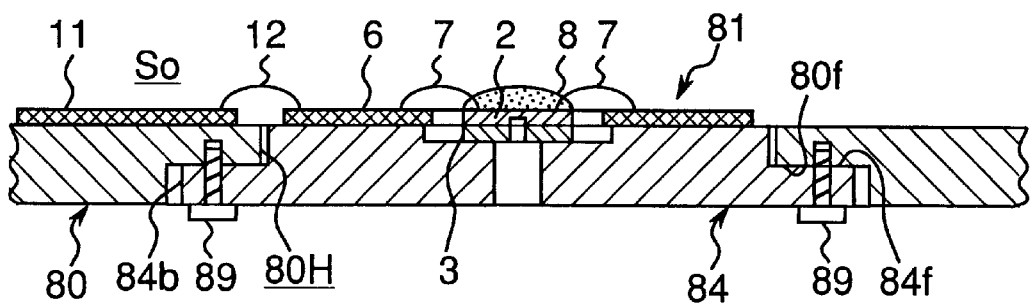
FIG. 15 is a longitudinal cross-sectional explanatory view showing the construction of a semiconductor pressure sensor according to an eighth embodiment of the invention as well as an assembled state of the semiconductor pressure sensor to the housing body.

As shown in FIG. 15, in a pressure sensor 81 according to this embodiment, after a sensor body 84 is inserted into a through hole 80H of a housing body 80 until a flange surface 84f of the sensor body 84 is stopped in contact with a receiving surface 80f on the through hole 80H side, screw members 89 are screwed from the rear surface side of a flange portion 84b of the sensor body 84, by which the sensor body 84 is tightened and fixed to the housing body 80.

As a result, the sensor body 84 formed into a plate shape is fixed to the through hole 80H of the housing body 80 easily and reliably, while enough fixing force to ensure the sealability between inside Si and outside So of the housing body 80 is obtained.

This eighth embodiment has been exemplified by a type in which no seal member is provided between the flange portion 84b of the sensor body 84 and the stepped portion of the through hole 80H of the housing body 80. However, the fixing structure using a screw may be adopted for types in which such a seal member is incorporated. Furthermore, in the embodiment, a reinforcing portion, as same as in the sixth or seventh embodiment, may be formed on the other (rear) surface side of the sensor body.

Furthermore, the method for fixing the sensor body of the pressure sensor to the through hole of the housing body is not limited to the fixing by caulking or the fixing by tightening with a screw, and an adhesive may be applied for fixing if the adhesive has resistance to the pressure medium.

Embodiment 9:

Next, a ninth embodiment of the invention is described. This ninth embodiment employs a sensor element of the type that an output adjustment circuit is incorporated.

Figure 16:
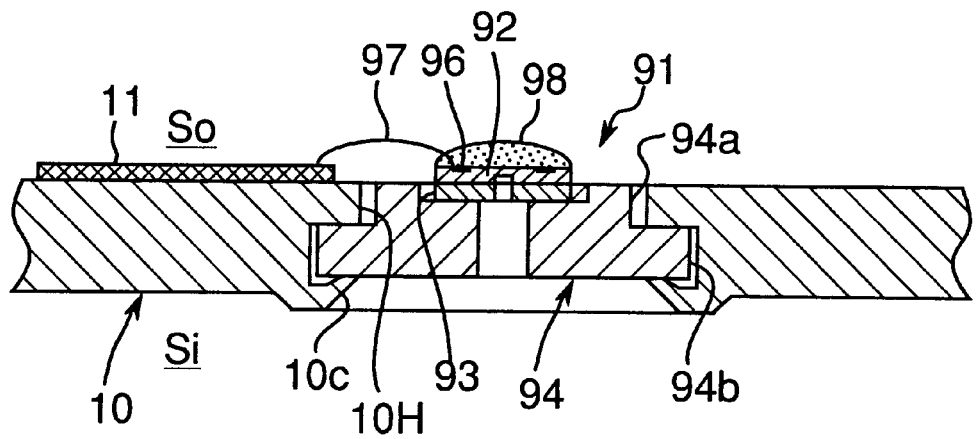
FIG. 16 is a longitudinal cross-sectional explanatory view showing the construction of a semiconductor pressure sensor according to a ninth embodiment of the invention as well as an assembled state of the semiconductor pressure sensor to the housing body.
Figure 17:
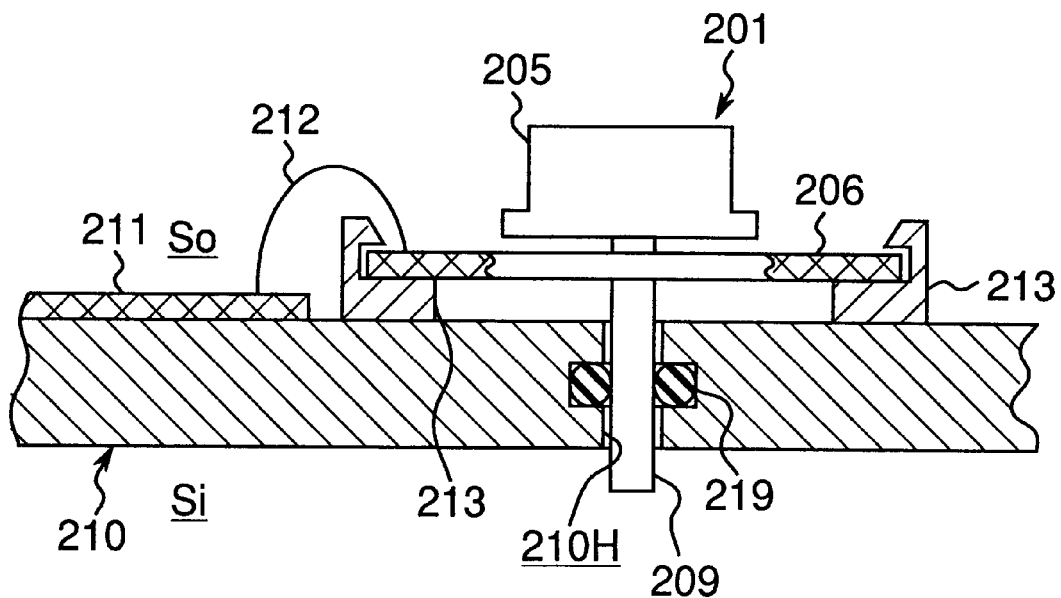
FIG. 17 is a partial cross-sectional explanatory view showing the construction of a semiconductor pressure sensor according to the prior art as well as an assembled state of the semiconductor pressure sensor to the housing body.

As shown in FIG. 16, in a pressure sensor 91 according to this embodiment, instead of provided the adjustment circuit board 6 separately from the sensor element 2 as in the foregoing first to eighth embodiments, an output adjustment circuit 96 having a resistor circuit for adjusting electrical characteristics of the sensor element 92, a signal amplifying circuit and the like is incorporated into a sensor element 92 itself.

Accordingly, there is no need for separately providing an adjustment circuit board and mounting it to the base portion of the sensor body, so that the planar size of a base portion 94a of the sensor body 94 (and therefore the planar size of a flange portion 94b as well) can be reduced to a very small one, in comparison with the first to eighth embodiments. Further, the need for the process of connecting the sensor element 2 and the adjustment circuit board 6 to each other by the lead wires 7, as has been involved in the first to eighth embodiments, is also eliminated.

In the process of assembling the pressure sensor 91 to the housing body 10, a unit body is preliminarily made up from the plate-shaped sensor body 94, the pedestal seat 93 and the sensor element 92, and then the resulting unit body is inserted into the through hole 10H from inside of the housing body 10. Then, in the same way as in the first embodiment as an example, the caulking portion 10c of the housing body 10 is bent inward by using a press so that the sensor body 94 is fixed into the through hole 10H.

After the pressure sensor 91 is assembled to the housing body 10 in this way, the system circuit board 11 mounted to the housing body 10 and the output adjustment circuit 96 for the sensor element 92 are electrically connected to each other by lead wires 97, and then the surface of the sensor element 92 is covered with a gel layer 98. In addition, the sensor element 92 is similar to those conventionally known and therefore detailed description and illustration of its construction and operation and the like are omitted.

As described above, according to this embodiment, the sensor body 94 is plate shaped and one type of semiconductor sensor element 92 having the output adjustment circuit 96 is used. As a result, the pressure sensor 91 can be reduced in planar size and besides simplified in structure, while assembling processes and parts number involved can be further reduced.

Furthermore, since the sensor body 94 is formed into a plate shape of a specified thickness having the flange portion 94b and fixed by being inserted into the stepped through hole 10H provided in the housing body 10, the sensor body 94 can be fixed directly to the housing body in the assembling process of the pressure sensor 91 to the housing body 10, so that the assembling structure of the pressure sensor 91 to the housing body 10 can be simplified to a large extent, as compared with the conventional case in which the adjustment circuit board provided separately from the sensor body would be held by a holder provided in the housing body. In this case, the sealability between inside and outside of the housing body 10 is ensured at the abutting surface between the flange portion 94b of the sensor body 94 and the stepped portion of the through hole 10H of the housing body 10. Further, by appropriately setting the thickness of the sensor body 94 in view of the thickness of the housing body 10, the extent to which the pressure sensor 91 is protruded from the housing body surface can be made far smaller than the conventional counterpart. As a result of this, the assembled state of the pressure sensor 91 to the housing body 10 can be made very compact.

In addition, this ninth embodiment has been exemplified by a type in which no seal member is provided between the flange portion 94b of the sensor body 94 and the stepped portion of the through hole 10H of the housing body 10. However, this embodiment may be applied likewise for types in which such a seal member is incorporated. Also, as a matter of course, the embodiment may be applied also to the cases of fixing structure using a screw or adhesive. Furthermore, in the embodiment, a reinforcing portion, as same as in the sixth or seventh embodiment, may be formed on the other (rear) surface side of the sensor body.

The present invention is not limited to the above-described embodiments, and it is needless to say that various modifications and design changes may be made without departing from the gist of the invention.

What is claimed is:

1. A semiconductor pressure sensor for detecting pressure of a pressure medium, the semiconductor pressure sensor comprising:

a semiconductor sensor element configured to detect pressure;

a sensor body having a base portion and a flange portion below the base portion, said flange portion being wider than the base portion such that a flange surface is formed on an upper surface of the flange portion, said sensor body being configured to fit into a stepped hole formed in a housing body partitioning the pressure medium from another medium, said housing body forming a step around the stepped hole, said flange surface being configured to be coupled with the step of the housing body, said sensor body having a plate shape with a predetermined thickness; and an adjustment circuit configured to adjust electrical characteristics of the semiconductor sensor element, the adjustment circuit board being coupled to an upper surface of the base portion; and a pedestal seat configured to support the semiconductor sensor element and couple the semiconductor sensor element to the sensor body, the pedestal seat being coupled to the upper surface of the base portion.

2. The semiconductor pressure sensor according to claim 1, wherein the sensor body is fixed to the housing body by caulk.

3. The semiconductor pressure sensor according to claim 1, wherein the sensor body is fixed to the housing body with a screw.

4. The semiconductor pressure sensor according to claim 1, wherein a seal member is provided between the step of the housing body and the flange surface.

5. The semiconductor pressure sensor according to claim 4, wherein a protective mechanism for the seal member to protect the seal member from being excessively deformed is provided at either the step of the housing body or the flange surface.

6. The semiconductor pressure sensor according to claim 1, wherein a reinforcing portion is formed on the other surface side of the sensor body.

7. The semiconductor pressure sensor according to claim 6, wherein the reinforcing portion is formed into a beam shape.

8. The semiconductor pressure sensor according to claim 6, wherein the reinforcing portion is formed concentric with a pressure introducing hole to the semiconductor sensor element.

9. A semiconductor pressure sensor for detecting pressure of a pressure medium, the semiconductor pressure sensor comprising:

a semiconductor sensor element configured to detect pressure, said semiconductor sensor element including an adjustment circuit configured to adjust electrical characteristics of the semiconductor sensor element;

a sensor body having a base portion and a flange portion below the base portion, said flange portion being wider than the base portion such that a flange surface is formed on an upper surface of the flange portion, said sensor body being configured to fit into a stepped hole formed in a housing body partitioning the pressure medium from another medium, said housing body forming a step around the stepped hole, said flange surface being configured to be coupled with the step of the housing body, said sensor body having a plate shape with a predetermined thickness; and a pedestal seat configured to support the semiconductor sensor element and couple the semiconductor sensor element to the sensor body, the pedestal seat being coupled to an upper surface of the base portion.

10. The semiconductor pressure sensor according to claim 9, wherein the sensor body is fixed to the housing body by caulk.

11. The semiconductor pressure sensor according to claim 9, wherein the sensor body is fixed to the housing body with a screw.

12. The semiconductor pressure sensor according to claim 9, wherein a seal member is provided between the step of the housing body and the flange surface.

13. The semiconductor pressure sensor according to claim 12, wherein a protective mechanism for the seal member to protect the seal member from being excessively deformed is provided at either the step of the housing body or the flange surface.

14. The semiconductor pressure sensor according to claim 9, wherein a reinforcing portion is formed on the other surface side of the sensor body.

15. The semiconductor pressure sensor according to claim 14, wherein the reinforcing portion is formed into a beam shape.

16. The semiconductor pressure sensor according to claim 14, wherein the reinforcing portion is formed concentric with a pressure introducing hole to the semiconductor sensor element.

* * * * *